United States Patent Office.

GEORGE W. DOTY, OF WOOSTER, OHIO.

Letters Patent No. 94,405, dated August 31, 1869.

IMPROVED COMPOUND TO BE APPLIED TO FRUIT-JARS FOR RECEIVING WRITTEN LABELS.

The Schedule referred to in these Letters Patent and making part of the same.

To all whom it may concern:

Be it known that I, GEORGE W. DOTY, of Wooster, in the county of Wayne, and State of Ohio, have invented certain new and useful Improvements in Labelling Fruit-Jars, Cans, and Glass Bottles; and I do hereby declare that the following is a full, clear, and exact description thereof.

The nature of my invention consists in preparing a wash to be applied to the surface of glass or metal fruit-jars, on which may be written, either with pen or pencil, the name of the material contained within the jars; the said wash being compounded in the manner hereinafter described.

Composition.

Alcohol, one gallon.
Gum-shellac, two pounds.
Wheat-starch, two pounds.
Borax, six ounces.
Ether, four ounces.

When the above ingredients are thoroughly incorporated with the alcohol, the composition will be applied with a brush to so much of the surface of the jar as required.

Having thus described my invention,

What I claim, and desire to secure by Letters Patent, is—

The preparation of a wash to be applied to the surface of glass or metallic surfaces, the said wash being compounded substantially as described, and for the purpose set forth.

In testimony that I claim the foregoing as my own, I affix my signature, in presence of two witnesses.

GEO. W. DOTY.

Witnesses:
   HENRY LEHMAN,
   LUCIAN ADAMS.